July 23, 1957  W. ALLISON  2,800,054
PROJECTION DEVICE WITH DIRECTIONAL LENS
Filed June 29, 1953

INVENTOR.
WILLIAM ALLISON
BY
Raymond A. Jaquin
ATTORNEY.

United States Patent Office 2,800,054
Patented July 23, 1957

2,800,054

PROJECTION DEVICE WITH DIRECTIONAL LENS

William Allison, Huntington Station, N. Y., assignor to American Bosch Arma Corporation, a corporation of New York Application June 29, 1953, Serial No. 364,864

4 Claims. (Cl. 88—24)

The present invention relates to projection systems and has particular reference to improvements in translucent screens therefor.

For maximum brightness the image on a translucent screen is usually reviewed straight-on, since the light is not directed toward the eye when viewing from either the right or left of center and an apparently less brilliant surface is seen. The present invention is a prism lens placed between the screen and observer which divides and directs the light transmitted through the screen into at least two different directions, preferably three, so that the image is of equal brilliance when viewed from any direction into which the light is directed. This device is particularly useful where several observers must continuously refer to the screen from their fixed stations relative to the screen.

For a more complete understanding of the invention reference may be had to the accompanying diagrams in which, Figure 1 represents the general problem involved;

Figure 4 shows the image as seen from a position straight on; and

Figure 1:
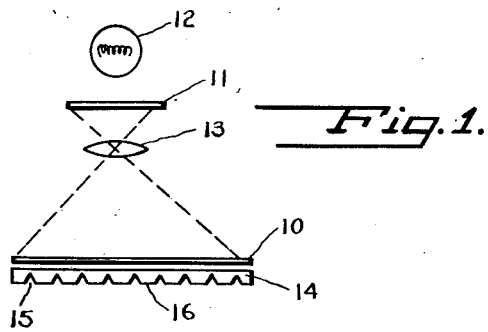
Figure 2:
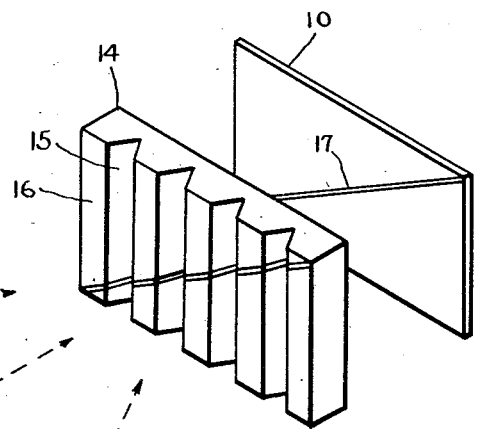
Figure 2 is a pictorial view of the divider-director lens.

Referring now to Figures 1 and 2 of the drawings three observers at $a$, $b$ and $c$ are expected to read the data projected onto the translucent screen 10 from the transparency 11 located between the light source 12 and projection lens 13. Without the transparent lens 14, which is the divider-director lens, an image of maximum brilliance would be seen by $b$, while $a$ and $c$ would see an image of lesser intensity. In order to equalize the intensity of the image at all three stations the divider-director lens 14 is interposed between the screen 10 and the observers. The lens 14 consists of a number of parallel prisms which may be constructed into an integral piece of material by forming vertically extending grooves 15 on the front surface of the lens. For three stations, as shown in Figure 1, the shape of the grooves 15 are isosceles triangles, separated sufficiently to leave a flat surface 16 on lens 14 between the grooves 15. Calculation of the angle of slope of the sides of the grooves 15 involves consideration of the angle from which the screen is to be observed and the refractive index of the material of lens 14. For three stations, two at 30° to either side of the center or direct view station, the sides of the groove 15 should make a 60° angle (approximately) for a plastic transparent material such as lucite for example. Use of the plastic material promises ease of manufacture, among other advantages, since the grooves of the lens can be formed by forcing the plastic against a carefully prepared die plate.

Figure 3:
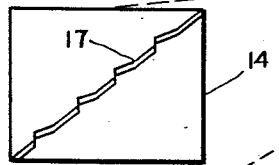
Figure 3 is a representation of an image on the screen as seen through the lens from a position to the right of center.
Figure 4:
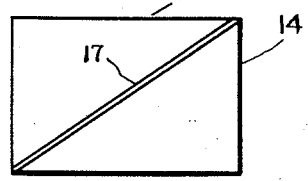
Figure 5:
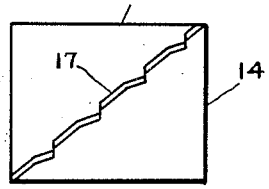
Figure 5 shows the image as seen from a position to the left of center.

A diagonal line 17 on screen 10 is seen at the positions $a$, $b$ and $c$ substantially as shown in the Figures 3, 4 and 5 respectively. The spacing between the prisms in Figure 2, is greatly exaggerated for clarity and in actual construction to obtain a picture of good definition the surface of lens 14 contains approximately 150 grooves per inch. In this event the images would approximate smooth lines and the apparently inferior images of Figures 3 and 5 would not be disturbing.

I claim:

1. In a rear projection system for use in connection with a projector for the projection of a single flat transparency, a translucent screen in optical alignment with said projector and adapted to be positioned between said projector and a plurality of observer stations substantially in the same plane and optical means between said screen and the observer for transmitting the image of said flat transparency received from said screen and projected into a plurality of directions whereby images of equal brilliance are observed when viewed from any of said plurality of stations, said optical means comprising a prism lens member having a plurality of prismatic surfaces formed by grooves separated by substantially flat surfaces formed in an integral plate and with the axes of the prisms being in a direction normal to said plane.

2. In a rear projection system for use in connection with a projector for the projection of a single flat transparency, a translucent screen in optical alignment with said projector and adapted to be positioned between said projector and a plurality of observer stations substantially in the same plane and optical means between said screen and the observer for transmitting the image of said flat transparency received from said screen and projected into a plurality of stations whereby images of equal brilliance are observed when viewed from any of said plurality of directions, said optical means comprising a prism lens member having a plurality of grooves separated by flat surfaces with the axes of the prisms being in a direction normal to said plane.

3. In a rear projection system for use in connection with a projector for the projection of a single flat transparency, a translucent screen in optical alignment with said projector and adapted to be positioned between said projector and a plurality of observer stations substantially in the same plane and optical means between said screen and the observer for transmitting the image of said flat transparency received from said screen and projected into a plurality of directions whereby images of equal brilliance are observed when viewed from any of said plurality of stations, said optical means comprising a prism lens member having a plurality of prismatic surfaces formed by grooves separated by substantially flat surfaces and with the axes of the prisms being in a direction normal to said plane, said optical means being formed of transparent plastic material.

4. In a rear projection system for use in connection with a projector for the projection of a single flat transparency, a translucent screen in optical alignment with said projector and adapted to be positioned between said projector and a plurality of observer stations substantially in the same plane and optical means between said screen and the observer for transmitting the image of said flat transparency received from said screen and projected into a plurality of directions whereby images of equal brilliance are observed when viewed from each of said plurality of stations, said optical means comprising a prism lens member having a plurality of grooves separated by flat surfaces with the axes of the prisms being in a direction normal to said plane, said optical means being formed of transparent plastic material.

(References on following page)

References Cited in the file of this patent

UNITED STATES PATENTS

| | | |
|---|---|---|
| 1,358,685 | Friedman | Nov. 9, 1920 |
| 1,484,287 | Bailey | Feb. 19, 1924 |
| 1,506,729 | Stewart | Aug. 26, 1924 |
| 1,806,864 | Pallemaerts | May 26, 1931 |
| 1,808,725 | De Francisco | June 2, 1931 |
| 1,919,561 | Kogel | July 25, 1933 |
| 2,313,947 | Klinkum | Mar. 16, 1943 |
| 2,550,350 | Henson | Apr. 24, 1951 |

FOREIGN PATENTS

| | | |
|---|---|---|
| 24,917 | Great Britain | of 1911 |